(12) United States Patent
Kejriwal et al.

(10) Patent No.: US 8,640,085 B2
(45) Date of Patent: Jan. 28, 2014

(54) GENERATING A SERVICE COMPONENT ARCHITECTURE (SCA) MODULE WITH SERVICE ORIENTED ARCHITECTURE (SOA) MODEL ELEMENTS

(75) Inventors: Manoj K. Kejriwal, Pune (IN); Lavanya Raghuraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/495,862

(22) Filed: Jul. 1, 2009

(65) Prior Publication Data

US 2011/0004862 A1    Jan. 6, 2011

(51) Int. Cl.
G06F 9/44    (2006.01)

(52) U.S. Cl.
USPC ............ 717/104; 717/101; 717/102; 717/105

(58) Field of Classification Search
USPC .................................. 717/104, 101, 102, 105
See application file for complete search history.

(56) References Cited

U.S. PATENT DOCUMENTS

| | | | |
|---|---|---|---|
| 2006/0242195 A1* | 10/2006 | Bove et al. | 707/103 R |
| 2008/0028365 A1* | 1/2008 | Erl | 717/105 |
| 2008/0127047 A1* | 5/2008 | Zhang et al. | 717/104 |
| 2008/0229276 A1* | 9/2008 | Koehler et al. | 717/104 |
| 2009/0319981 A1* | 12/2009 | Akkiraju et al. | 717/104 |
| 2010/0251207 A1* | 9/2010 | Allam et al. | 717/104 |

OTHER PUBLICATIONS

Strosnider, Model-driven synthesis of SOA solutions, published in 2008.*
Arsanjani, SOMA: A method for developing service-oriented solutions, published in 2008.*
Ding et al. A Rigorous Model of Service Component Architecture. Published by Elsevier B.V. Electronic Notes in Theoretical Theoretical Computer Science 207 (2008) pp. 33-48.
Johnston, Simon. Modeling Web Services, Part 1 XML Schema. [online] 15 pages. [retrieved on May 22, 2009]. Retrieved from the Internet:< URL: http://www.ibm.com/developerworks/rational/library/05/1129_johnston/>.
Johnston, Simon. Modeling Web Services, Part 2 Modeling and Generating WSDL. [online] 23 pages. [retrieved on May 22, 2009]. Retrieved from the Internet:< URL: http://www.ibm.com/developerworks/rational/library/06/0411_johnston/>.
Zhang et al. SOMA-ME: A Platform for the Model-Driven Design of SOA Solutions. IBM Systems Journal, vol. 47. No. 3. 2008. pp. 397-413.
IBM. Interpretation of UML Elements by UML-to-BPEL Transformations. [online]. 4 pages. [retrieved on May 4, 2009]. Retrieved from the Internet:< URL: http://publib.boulder.ibm.com/infocenter/rsahelp/v7r0m0/index.jsp?topic=/com.ibm.xtools.transform.uml2.bpel.doc/topics/rubpelmap.html>.

* cited by examiner

Primary Examiner — Chat Do
Assistant Examiner — Jae Jeon
(74) Attorney, Agent, or Firm — Schmeiser, Olsen & Watts, LLP; John Pivnichny

(57) ABSTRACT

A system and associated method for generating a Service Component Architecture (SCA) module with Service Oriented Architecture (SOA) model elements. A service model is created according to a process model that has activities and a process flow. Services of the service model are respectively associated with the activities. Each service is determined to employ only one service operation definition to render a message specification of a respective activity that is associated with each service. The activities, the process flow, and the message specification are utilized to produce the SCA module in executable implementations.

12 Claims, 19 Drawing Sheets

25E

26E

31E

Namespace: http://www.ibm.com/assets/poc/underwriting

FIG. 3A

32E package com.ibm.assets.poc.risk;

import commonj.sdo.DataObject;

GENERATING A SERVICE COMPONENT ARCHITECTURE (SCA) MODULE WITH SERVICE ORIENTED ARCHITECTURE (SOA) MODEL ELEMENTS

BACKGROUND OF THE INVENTION

The present invention discloses a system and associated method for generating a Service Component Architecture (SCA) module with combined process/service model elements of Service Oriented Architecture (SOA) by mapping the process/service model elements to respective SCA module artifacts. Conventional authoring tools generating executable SCA modules do not utilize all abstract modeling elements of process/service models that had been generated in previous phases of a project development cycle. The lack of a mapping mechanism between abstract process/service model elements and respective executable SCA module artifacts makes generating executable SCA modules inefficient and expensive.

BRIEF SUMMARY

According to one embodiment of the present invention, a method for generating a Service Component Architecture (SCA) module with Service Oriented Architecture (SOA) model elements comprises creating a service model corresponding to a process model, wherein the process model comprises at least one activity and a process flow, said at least one activity exchanging messages among said at least one activity according to said process flow, and wherein the service model comprises at least one service and at least one service operation definition; associating an activity of said at least one activity with a service of said at least one service such that an origin of the activity is identical to an origin of the service; determining a service operation definition of said at least one service operation definition that specifies an interface of the service associated with the activity; rendering a message specification of the activity from the interface of the service; a processor of a computer system producing the SCA module with the SOA model elements, wherein the SOA model elements comprise said at least one activity, the process flow, and the message specification, and wherein the SCA module is executable in the process flow, the SCA module comprising the activity communicating among said at least one activity according to the rendered message specification; and communicating the produced SCA module to a user of the computer system.

According to one embodiment of the present invention, a computer program product comprises a computer readable memory unit that embodies a computer readable program code. The computer readable program code contains instructions that, when executed by a processor of a computer system, implement generating a Service Component Architecture (SCA) module with Service Oriented Architecture (SOA) model elements.

According to one embodiment of the present invention, a computer system comprises a processor and a computer readable memory unit coupled to the processor, wherein the computer readable memory unit containing instructions that, when executed by the processor, implement generating a Service Component Architecture (SCA) module with Service Oriented Architecture (SOA) model elements.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for generating a Service Component Architecture (SCA) module with Service Oriented Architecture (SOA) model elements.

BRIEF DESCRIPTION OF THE SEVERAL VIEWS OF THE DRAWINGS

FIGS. 3A, 3B, 3C and 3D illustrate examples of the SCA module artifacts of FIG. 3, in accordance with the embodiments of the present invention.

DETAILED DESCRIPTION

Figure 1:
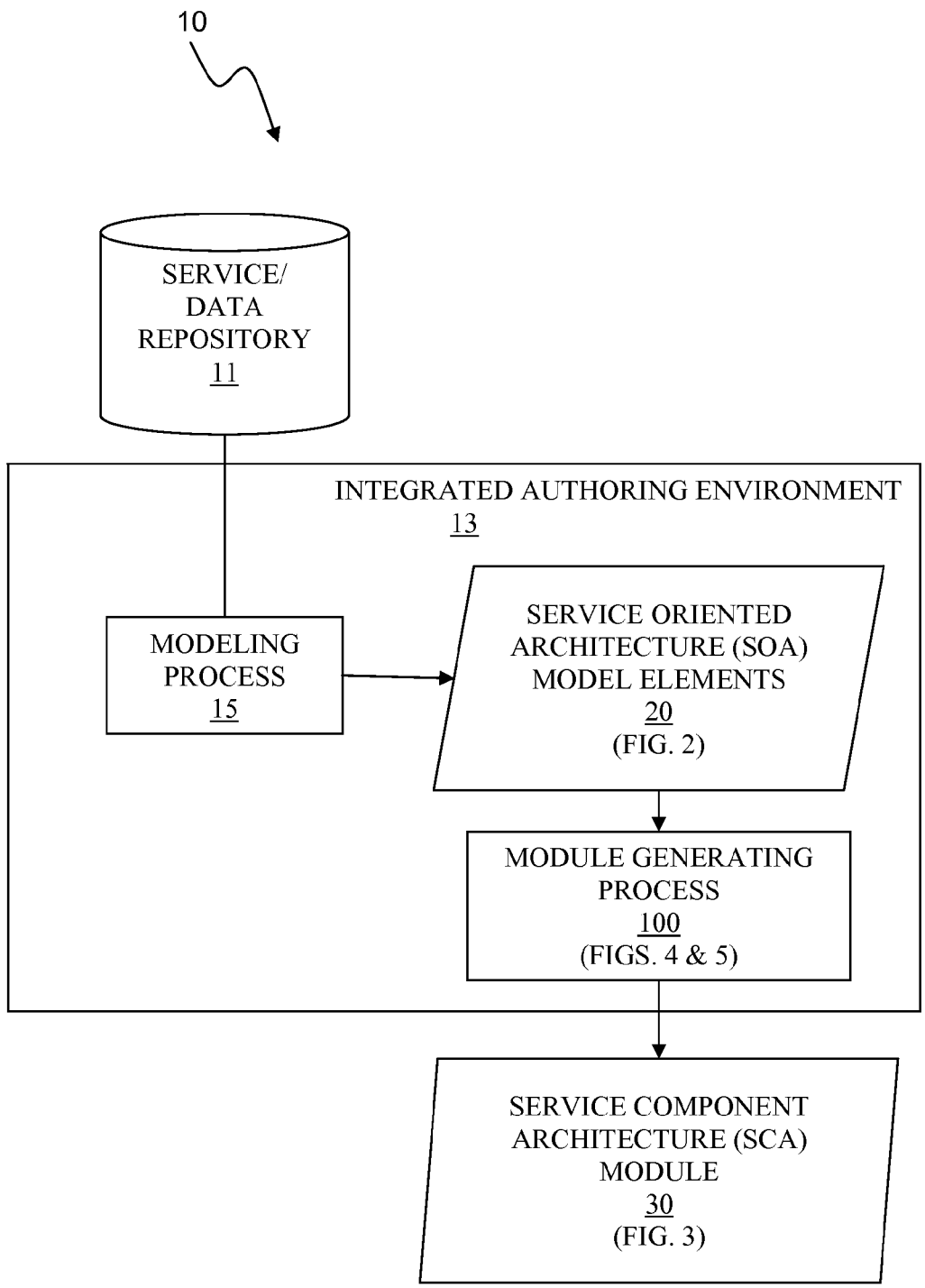
FIG. 1 illustrates a system 10 for generating a Service Component Architecture (SCA) module with Service Oriented Architecture (SOA) model elements, in accordance with embodiments of the present invention.

FIG. 1 illustrates a system 10 for generating a Service Component Architecture (SCA) module 30 with Service Oriented Architecture (SOA) model elements 20, in accordance with embodiments of the present invention.

A service, in service-oriented programming, is defined as a unit of solution logic comprising capabilities in a functional context. The term Service Oriented Architecture (SOA) is defined by the Organization for the Advancement of Structured Information Standards (OASIS), in the OASIS SOA Reference Model, as a "paradigm for organizing and utilizing distributed capabilities that may be under the control of different ownership domains. [The SOA] provides a uniform means to offer, discover, interact with and use capabilities to produce desired effects consistent with measurable preconditions and expectations."

The term Service Component Architecture (SCA) is defined as a more platform-independent paradigm than the SOA. The SCA intends to offer the flexibility for true composite applications, flexibly incorporating reusable components in an SOA programming style. To achieve a high degree of programmer productivity, the SCA removes the overhead of business logic programmer concerns regarding platforms, infrastructure, plumbing, policies and protocols. In this specification, the term SOA is used to indicate abstract aspects of modeling elements or to qualify models as being abstract. In this specification, the term SCA is used to indicate executable aspects of module artifacts or to qualify modules as being executable.

Service Component Architecture (SCA) is a set of specifications which describe a model for building applications and systems using a Service-Oriented Architecture (SOA). SCA extends and complements prior approaches to implementing services, and SCA builds on open standards such as Web services.

The system 10 comprises a service/data repository 11, an integrated authoring environment 13, and the Service Component Architecture (SCA) module 30.

The service/data repository 11 stores specifications of business services and data necessary to implement the Service Component Architecture (SCA) module 30 that performs the business services according to the specifications and data stored in the service/data repository 11. The SCA module 30 is generated by the integrated authoring environment 13 from information of the service/data repository 11.

The integrated authoring environment 13 comprises a modeling process 15, the Service Oriented Architecture (SOA) model elements 20, and a module generating process 100.

The modeling process 15 generates the SOA model elements 20 from the information stored in the service/data repository 11 by performing process modeling and service modeling.

The SOA model elements 20 describe business requirements such as process flow, service interface, etc., of the business services with respective abstract model elements. The SOA model elements 20 are presented in a general modeling languages such as Unified Modeling Language (UML). The SOA model elements 20 specify, visualize, construct and document the elements of an Object-Oriented, software-intensive system under development. In UML, the SOA model elements 20 describe abstract models of a specific system comprising actors, business processes, system components, activities, with graphical notation by using concrete tools of programming language statements, database schemas, reusable software components, etc. A SOA model is abstract and non-executable in the sense that the SOA model must be transformed to the SCA module to be executed in a computer system because of lack of operational details to be executed. The SOA model elements 20 are provided to the module generating process 100 as inputs. See descriptions of FIG. 2, infra, for details of the SOA model elements 20.

The module generating process 100 generates the SCA module 30 by mapping the SOA model elements 20 to a respectively corresponding artifact of the SCA module 30. See descriptions of FIG. 3, infra, for details of individual artifacts in the SCA module 30. See descriptions of FIG. 4, infra, for mappings made by the module generating process 100. The module generating process 100 combines the SOA model elements 20 from process modeling and service modeling to generate the SCA module 30. See descriptions of FIG. 5, infra, for detailed steps performed by the module generating process 100.

In a conventional authoring environment for SCA module generation, either a process model or a service model is selected for each component tool. Where a process model is used to generate a SCA module, input and output business objects of each tasks in the process model represents interface information at business level. Thus the interface information of the process model is typically coarse and not specific enough to be transformed into interface messages of executable modules. Where service modeling is performed by other component tool of the conventional authoring environment, detailed service message specifications at transactional level are generated. However, such detailed service message specifications are not employed in generating the SCA module based on the process model in the conventional authoring environment. Combining a process flow from the process model and service message specifications of the service model and establishing relationship between SOA model elements and SCA module artifacts improve efficiency and productivity of a project development by utilizing the output of each modeling to generate an improved form of executable modules.

In one embodiment of the present invention, the modeling process 15 is IBM® WebSphere® Business Modeler (WBM) and/or IBM Rational Software Architect (RSA) with Service Oriented Model and Architecture Modeling Environment (SOMA-ME) plug-in. IBM WBM generates process models and RSA SOMA-ME generates service models. The integrated authoring environment 13 is IBM WebSphere Integration Developer (WID) comprising a component tool that performs conventional module generation, and the SOA model elements 20 are WBM process models in Unified Modeling Language (UML) activity diagrams and service model elements. The module generating process 100 may be integrated with the IBM WebSphere Integration Developer (WID) to improve a module generating facility of the conventional authoring environment. (IBM, WebSphere and Rational are registered trademarks of International Business Machines Corporation in the United States and/or other countries.)

Conventional module generation tools neither define nor provide one-to-one relationship between the inputs of the SOA model elements 20 and an executable artifact of the SCA module 30. A process model typically defines activities and flow of activities of the executable module. A service model typically defines interfaces of the executable module. Either the process model or the service model can generate a SCA module, for example, in Business Process Execution Language (BPEL) with a process model defined in a modeling tool such as Websphere Business Modeler (WBM) or a service model presented in UML activity diagrams. However, the relationship between SOA modeling and SCA module generation is arbitrary in the sense that the generated SCA module varies based on the modeling elements employed to generate the SCA module. The SCA modules generated from the same set of specifications for business services are not coherent in conventional authoring environments.

The Service Component Architecture (SCA) module 30 is an output generated by the integrated authoring environment 13. The SCA module 30 comprises executable artifacts such as processes and interface messages that are respectively corresponding to the SOA model elements 20. See descriptions of FIG. 3, infra, for details of artifacts in the SCA module 30. The SCA module 30 may be generated in at least one selected executable language such as Business Process Execution Language (BPEL), Java, etc. The SCA module 30 utilizes both SOA process model elements and SOA service model elements. Process flows defined by SOA process model elements specifies activities and flows of the SCA module 30. The SOA service model elements such as service message specifications are employed to determine interface of each activity in the SCA module 30.

By mapping from SOA model elements to SCA module artifacts, the present invention achieves consistent and efficient generation of the SCA module from input modeling elements. Also, once the modeling is complete and all SOA model elements are created, there is no need to create SCA module artifacts from the scratch because the SCA module artifacts will be acquired by mapping from the SOA model elements. Consequently, a project development cycle becomes more efficient by saving time and efforts. Also, because the mapping describes relationship between each SOA model element and a corresponding SCA module element, an artifact of the output SCA module can be traced back to an input SOA modeling element. See descriptions of FIG. 4, infra, for mappings made by the module generating process 100.

In one embodiment of the present invention, the SCA module 30 is generated in Business Process Executable Language (BPEL), short for Web Services Business Process Execution Language (WS-BPEL). BPEL is a standard executable language for specifying interactions with Web Services. Processes in BPEL export and import information by using Web Service interfaces exclusively. BPEL is defined by a global consortium called the Organization for the Advancement of Structured Information Standards (OASIS), which promotes e-business and web service standards. The SCA module 30 in BPEL specifies executable and abstract business processes. BPEL extends a Web Services interaction model and enables the web service interaction model to support business transactions. Thus, the SCA module 30 in BPEL defines an interoperable integration model that should facilitate the expansion of automated process integration both within and between businesses.

In the same embodiment of the present invention, the SCA module 30 is generated in BPEL and/or Java® depending on configurations of the integrated authoring environment 13, which is IBM WebSphere Integration Developer (WID). (Java is a registered trademark of Sun Microsystems, Inc., in the United States and/or other countries.)

Figure 2:
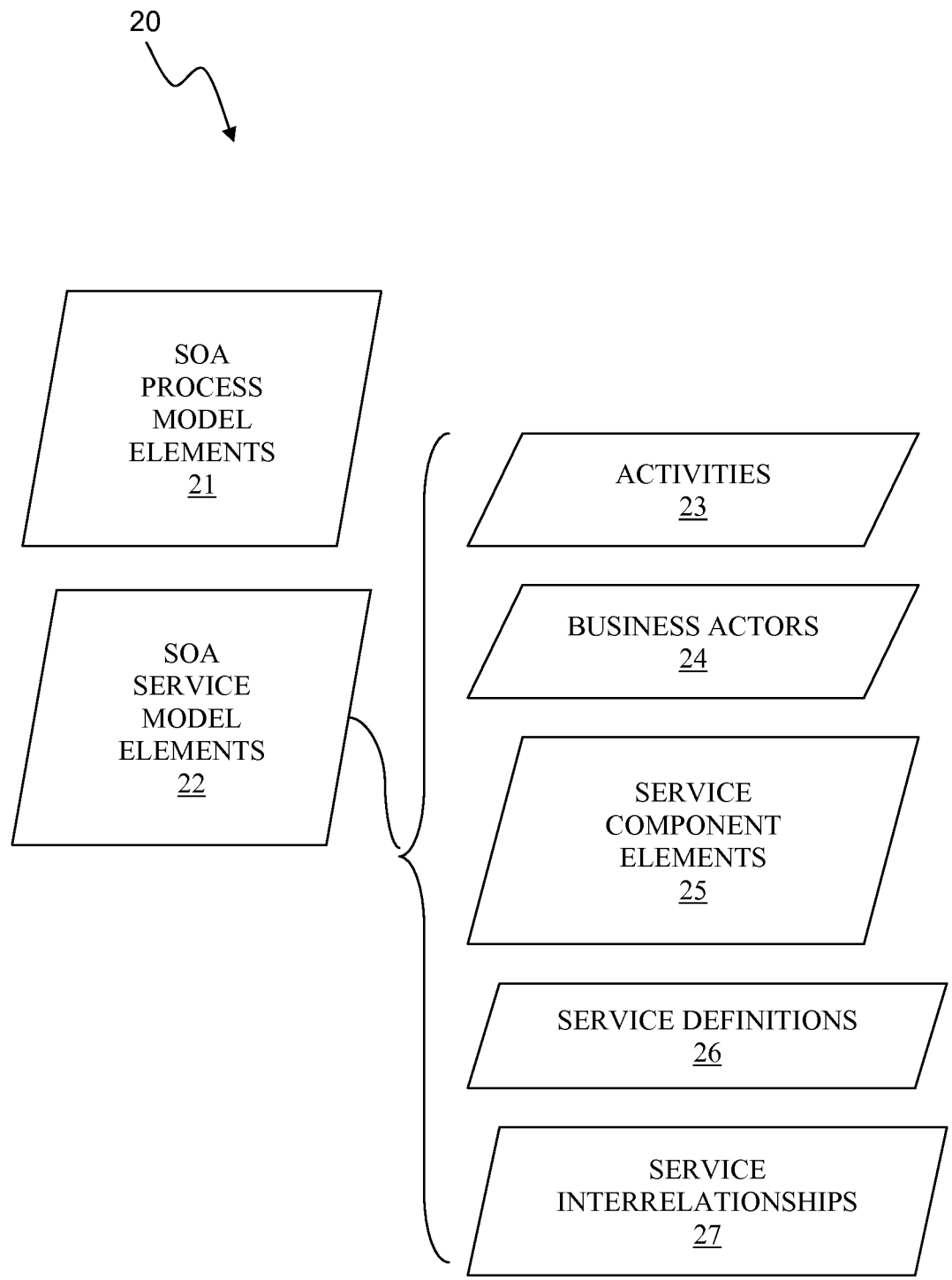
FIG. 2 illustrates the SOA model elements of FIG. 1, which are inputs of the module generating process, in accordance with the embodiments of the present invention.

FIG. 2 illustrates the SOA model elements 20 of FIG. 1, supra, which are inputs of the module generating process 100, in accordance with the embodiments of the present invention.

The SOA model elements 20 comprise SOA process model elements 21 and SOA service model elements 22. In one embodiment of the present invention, the SOA process model elements 21 comprise a Unified Modeling Language (UML) activity diagram. UML is a standardized general-purpose modeling language to create abstract models of specific systems. A UML activity diagram represents businesses and operational step-by-step workflows of components in a system, which describes an overall flow of control. See FIG. 2A, infra, for an example of the process model which when imported in IBM Rational Software Architect (RSA) generates a UML activity diagram.

The SOA service model elements 22 comprise activities 23, business actors 24, service component elements 25, service definitions 26, and service interrelationships 27. The activities 23, short for service activities, refer to a chain of message exchanges to be performed to execute a specific task or a business process. In one embodiment of the present invention, the activities 23 are UML activities that had been generated by IBM WebSphere Business Modeler (WBM) modeling tool. See FIG. 2B, infra, for an example of the activities 23.

The business actors 24 are entities performing tasks in the service model. In one embodiment of the present invention, the business actors 24 are UML actors in a UML use case diagram that had been generated by IBM WebSphere Business Modeler (WBM) modeling tool. See FIG. 2C, infra, for an example of the business actors 24.

The service component elements 25 comprise service components, functional components, technical components, and subsystems. The service components are a unit of deployment performing a business service. The functional components represent components providing actual functionalities toward a desired service. The technical components represent technically required components for other functional/service components to perform a desired service. See FIG. 2D, infra, for an example of the service component elements 25.

The service definitions 26 comprise service allocations to each service component, service operation definition, and service message specification. The term "service allocation" See FIG. 2E, infra, for examples of service allocations. The term "service operation" is defined as a function or a capability that an implemented service exposes via a Web service contract, especially in relation to operation elements in the Web Services Description Language (WSDL). The term "service operation" is used to indicate that the operation is part of an actual Web service designed under the SOA programming paradigm.

The service interrelationships 27 comprise component diagrams, service dependency diagrams, service hierarchies, and service flows.

Figure 2A:
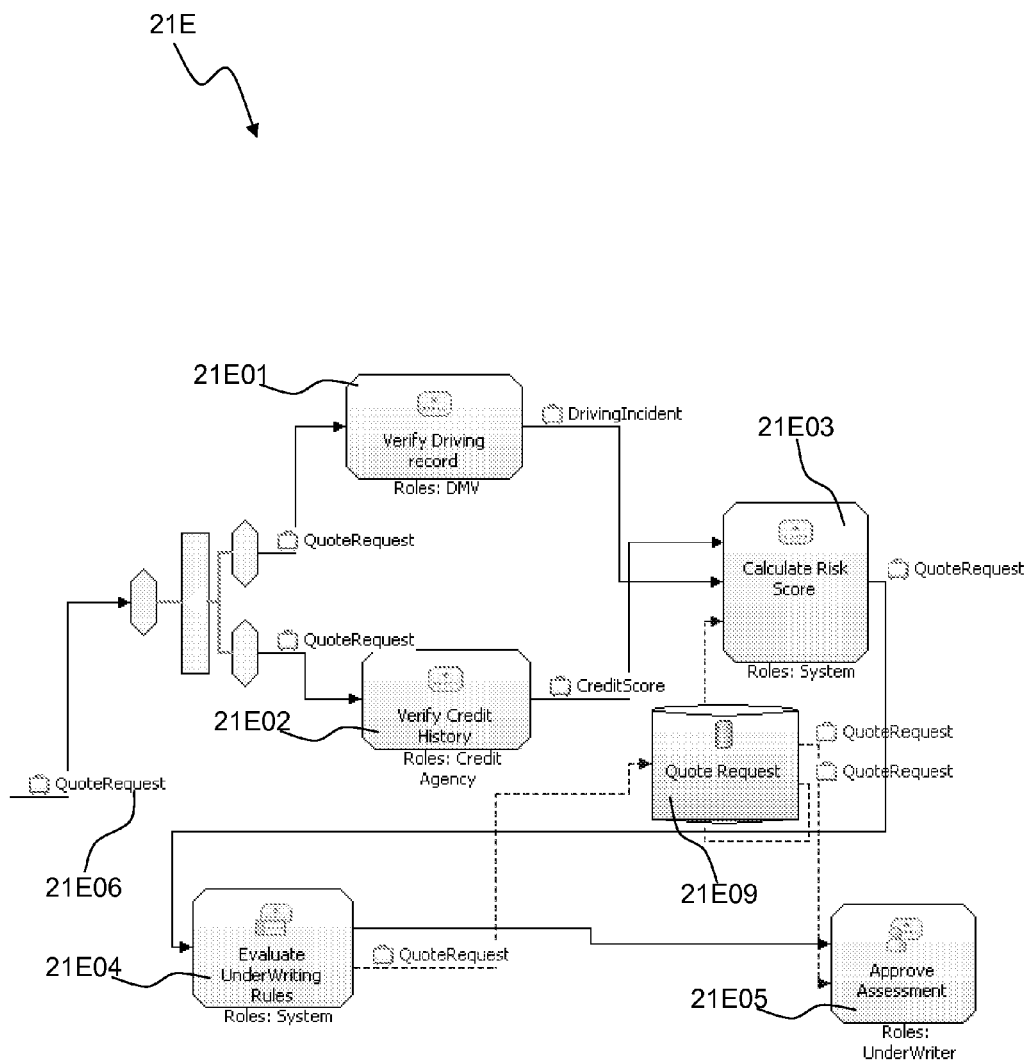
FIG. 2A illustrates an example QuoteIssueProcess process model of the SOA model elements of FIG. 2, in accordance with the embodiments of the present invention.

FIG. 2A illustrates an example QuoteIssueProcess process model 21E of the SOA model elements of FIG. 2, supra, in accordance with the embodiments of the present invention.

The example QuoteIssueProcess process model 21E presents a business process model to issue a quote for car insurance upon being requested. The example QuoteIssueProcess process model 21E is created by IBM WebSphere Business Modeler (WBM) tool. The example QuoteIssueProcess process model 21E is subsequently imported into IBM Rational Software Architect (RSA) authoring environment to generate a corresponding UML Activity Diagram.

The example process model 21E comprises activities Verify Driving Record 21E01, Verify Credit History 21E02, Calculate Risk Score 21E03, Evaluate Underwriting Rules 21E04, Approve Assessment 21E05, and a data repository Quote Request 21E09. The activity Verify Driving Record 21E01 verifies that a driver's license number submitted by an applicant is valid. The activity Verify Credit History 21E02 gets a credit score of the applicant. The activity Calculate Risk Score 21E03 calculates risks associated with enrolling the applicant. The activity Evaluate Underwriting Rules 21E04 evaluates underwriting rules comprising a checklist of items such as whether or not a vehicle of the applicant has been modified in the past for racing, whether or not the driver's license of the applicant has ever been suspended, etc. The activity Approve Assessment 21E05 results in approving the assessment of a quote application. The data repository Quote Request 21E09 represents all information furnished while processing a QuoteRequest 21E06.

FIGS. 2B, 2C, 2D, and 2E illustrate examples of the SOA service model elements 22 of FIG. 2, supra, in accordance with the embodiments of the present invention.

Figure 2B:
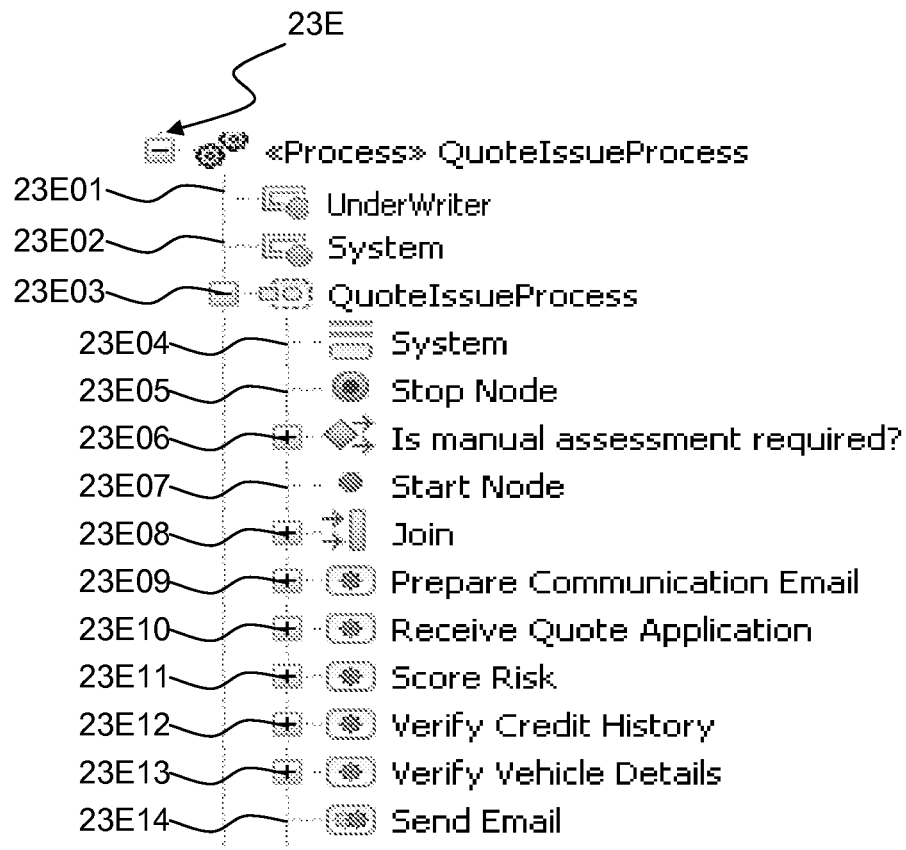
FIGS. 2B, 2C, 2D, and 2E illustrate examples of the SOA service model elements of FIG. 2, in accordance with the embodiments of the present invention.

FIG. 2B illustrates an example of a process QuoteIssueProcess 23E. The process QuoteIssueProcess 23E comprises items UnderWriter 23E01, System 23E02, and QuoteIssueProcess 23E03.

The item UnderWriter 23E01 assesses a result evaluated by the System 23E02 for an application for a quote request against underwriting rules. The Underwriter 23E01 creates a result different from the result evaluated by the System 23E02, if the UnderWriter 23E01 determines that the system 23E02 did not evaluated the application properly. The item System 23E02 performs fully automated tasks or offers a user interface to Human Tasks. The item QuoteIssueProcess 23E03 comprises items system 23E04, Stop Node 23E05, Is manual assessment required? 23E06, Start Node 23E07, Join 23E08, Prepare Communication Email 23E09, Receive Quote Application 23E10, Score Risk 23E11, Verify Credit History 23E12, Verify Vehicle Details 23E13, and Send Email 23E14.

The item System 23E04 performs fully automated tasks or offers a user interface to Human Tasks. The item Stop Node 23E05 indicates a termination of the process flow. The item is manual assessment required? 23E06 ascertains whether a manual assessment of the risk scoring is required, which is typically performed with a high-risk applicant. The item Start Node 23E07 indicates a beginning of the business process. The item Join 23E08 indicates a node where two parallel activities will merge. The item Prepare Communication Email 23E09 prepares an email with content containing the outcome of the item QuoteIssueProcess 23E03. The item Receive Quote Application 23E10 receives a quote application from an applicant and forwarding it for processing. The item Score Risk 23E11 calculates the risk score of the received quote application. The item Verify Credit History 23EL12 acquires a credit score of this applicant given the SSN of the applicant. The item Verify Vehicle Details 23E13 validates a vehicle registration number that the applicant had submitted. The item Send Email 23E14 sends an email to the applicant about the outcome of the quote issue process.

Figure 2C:

FIG. 2C illustrates an example of the business actors 24E.

Figure 2D:
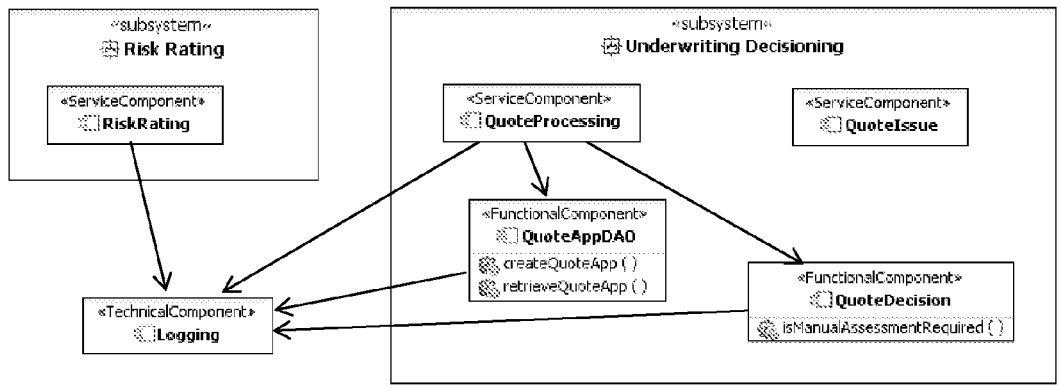

FIG. 2D illustrates an example of the service component elements 25E.

Figure 2E:
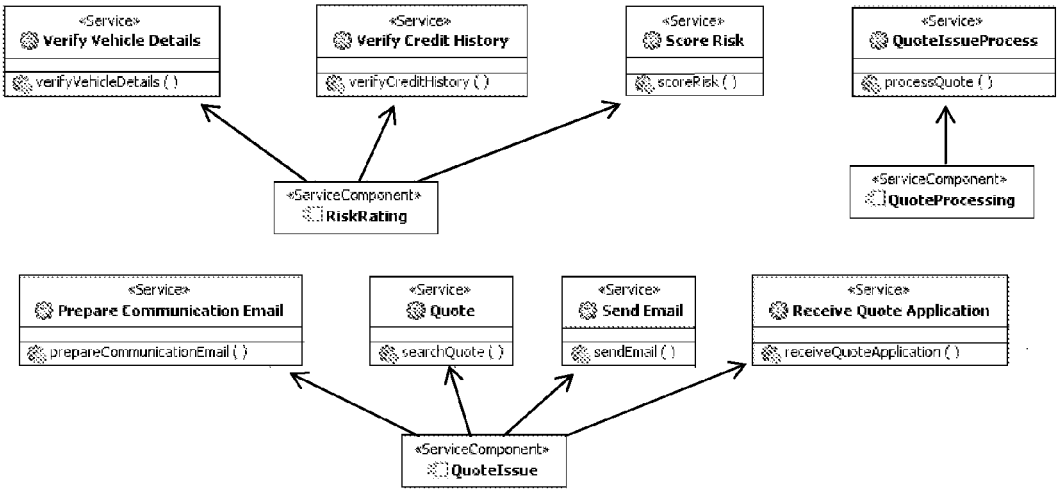

FIG. 2E illustrates an example of the service definitions 26E. A service component QuoteProcessing comprises two service components QuoteIssue and RiskRating. A service QuoteIssueProcess is allocated to the service component QuoteProcessing. A service Verify Vehicle Details, a service Verify Credit History, and a service Score Risk are allocated to the service component RiskRating. A service Prepare Communication Email, a service Quote, a service Send Email, and a service Receive Quote Application are allocated to the service component QuoteIssue. See FIG. 4A, infra, for service dependency for the example of the service definitions 26E.

Figure 3:
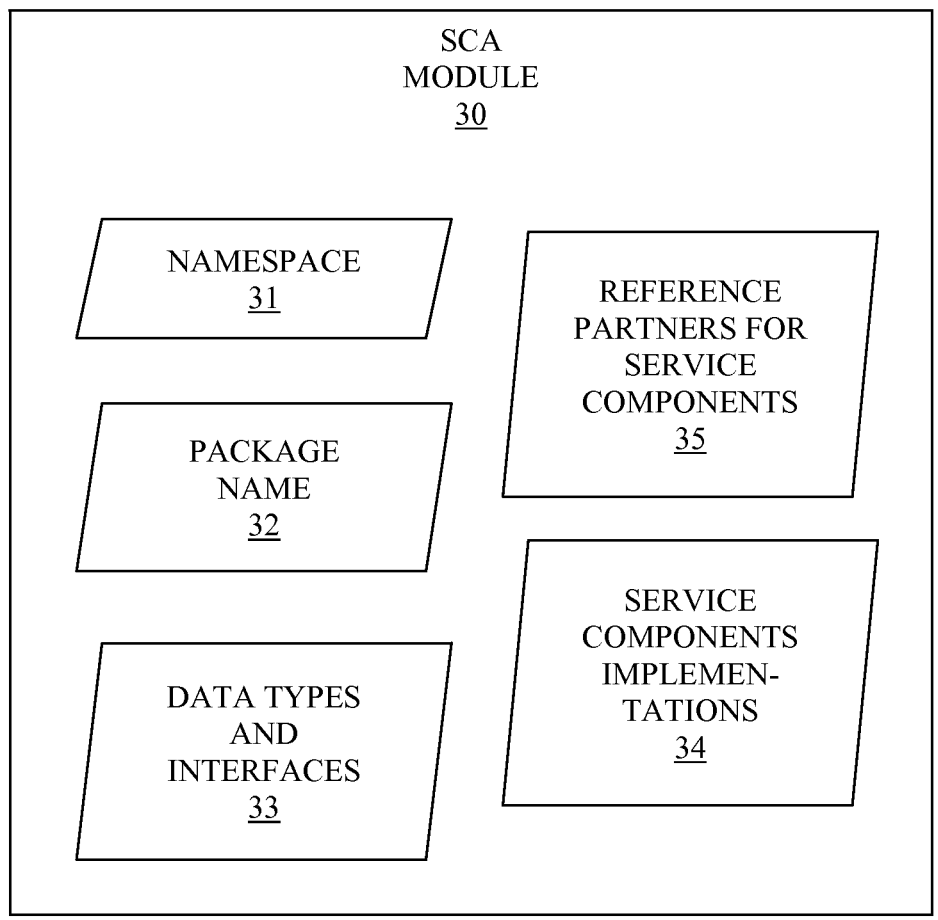
FIG. 3 illustrates the SCA module of FIG. 1, which are outputs of the module generating process, in accordance with the embodiments of the present invention.

FIG. 3 illustrates the SCA module 30 of FIG. 1, supra, which are outputs of the module generating process 100, in accordance with the embodiments of the present invention.

The SCA module 30 comprises artifacts namespace 31, package name 32, data types and interfaces 33, service components implementations 34, and reference partners for service components 35. In this specification, the term "SCA module" is interchangeably referred to the term "composite application," which is defined as a basic unit of deployable application in SCA programming model. A composite application comprises a series of service components which are assembled together to create solutions that serve a particular business need. Service components, or shortly components, contain the business function provided by the module, which is referred to as a "Service". The service is accessed internally within a Component or is accessed remotely from an external Component. An external component accesses the service through an entry point. Wherein a component depend on services provided by external components, such dependencies are referred to as references. Access methods to the service components in SCA programming model also utilize wide range of technologies, inter alia, Web services, Messaging systems and Remote Procedure Call (RPC), etc.

The namespace 31 is a means of adding groups of XML elements and attributes to a common scope. The namespace 31 defines a range of symbols for data types and WSDL interface definitions. See FIG. 3A, infra, for an example of the namespace 31.

The package name 32 indicates identifiers of implementation packages, for example, in Java. See FIG. 3B, infra, for an example of the package name 32.

The data types and interfaces 33 are represented in Web Services Description Language (WSDL) files and XML Schema Definitions (XSDs). See FIG. 3C, infra, for an example of the data types and interfaces 33.

The service components implementations 34 comprise various implementations of service components in executable forms. An implementation is a piece of program code implementing business functions of the service component. In one embodiment of the present invention, the service components implementations 34 are in BPEL and/or Java. The reference partners for service components 35 represents entities on which the service components are dependent to perform a service allocated to the service components. See FIG. 3D, infra, for an example of the service components implementations 34 and the reference partners for service components 35.

In one embodiment of the present invention, the artifacts of the SCA module 30 are represented in various formats, inter alia, BPEL, WSDL, SCA Components, namespace and package per respective implementation of service components.

FIGS. 3A, 3B, 3C and 3D illustrate examples of the SCA module artifacts of FIG. 3, supra, in accordance with the embodiments of the present invention.

FIG. 3A illustrates an example of the namespace 31.

FIG. 3B illustrates an example of the package name 32.

Figure 3C:
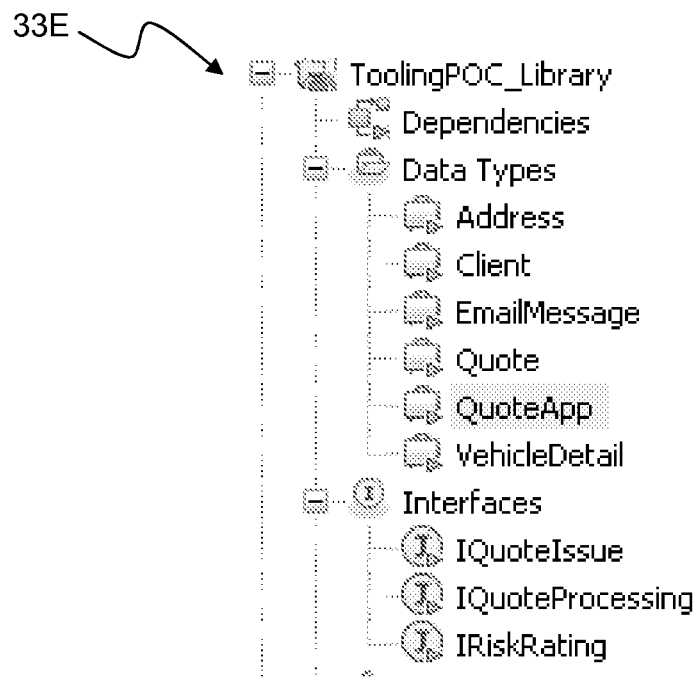

FIG. 3C illustrates an example of the data types and interfaces 33.

Figure 3D:
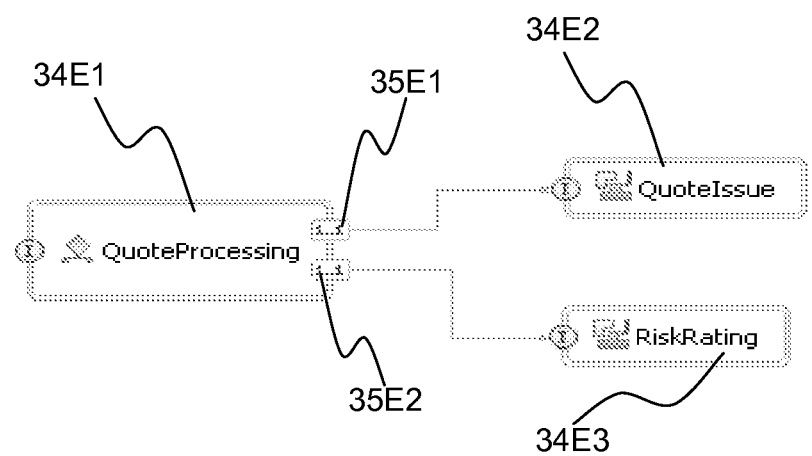

FIG. 3D illustrates an example of the service components implementations 34 and the reference partners for service components 35. See descriptions of FIG. 4A, infra, for details.

Figure 4:
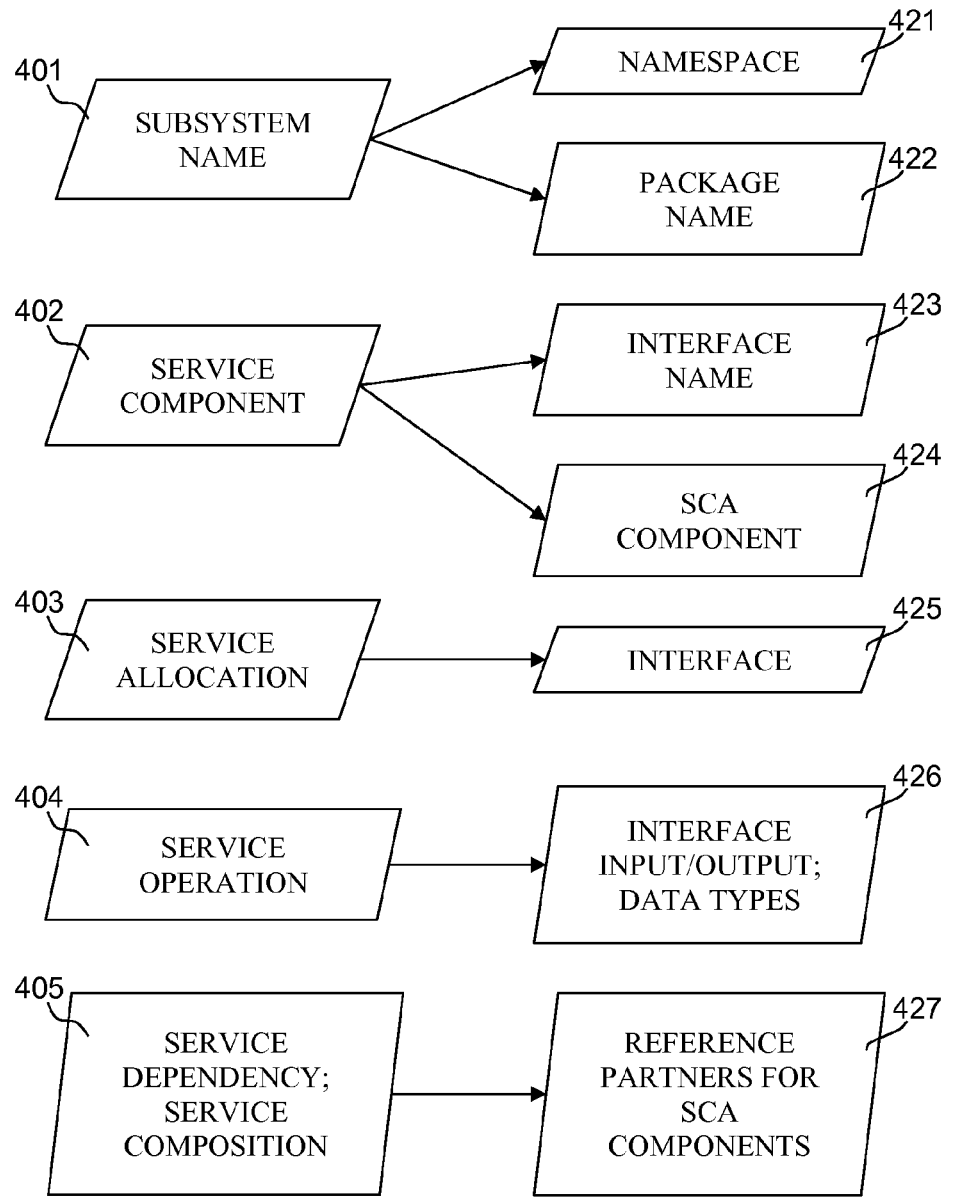
FIG. 4 illustrates mappings between the SOA service model elements and the SCA module artifacts, in accordance with the embodiments of the present invention.

FIG. 4 illustrates mappings between the SOA service model elements and the SCA module artifacts, in accordance with the embodiments of the present invention.

A subsystem name 401 of the SOA service model elements is utilized to define either a namespace 421 or a package name 422 of the SCA module artifacts.

A service component 402 of the SOA service model elements is utilized to define an interface name 423 of the SCA module artifacts. The service component 402 is also utilized to generate a SCA component 424. In one embodiment of the present invention, the service component 402 of the SOA service model specifies a type of implementation, either BPEL or Java, for the SCA component 424.

A service allocation 403 is defined as an association of a service to a service component. The service allocation 403 is utilized to define an interface 425 of a SCA component. In one embodiment of the present invention, wherein the integrated authoring environment is IBM WebSphere Integration Developer (WID), only one service is allocated to a service component.

A service operation 404 is defined supra as a function or a capability that an implemented service exposes via a Web service contract, especially in relation to operation elements in the Web Services Description Language (WSDL). The service operation 404 is utilized to define interface input/output and a data type 426 of the SCA module artifacts.

Service dependency and service composition 405 of the SOA service model are utilized to define reference partners for SCA components 427. A service composition indicates an aggregate of participating services and a composition initiator that are collectively composed to automate a particular task or business process.

Figure 4A:
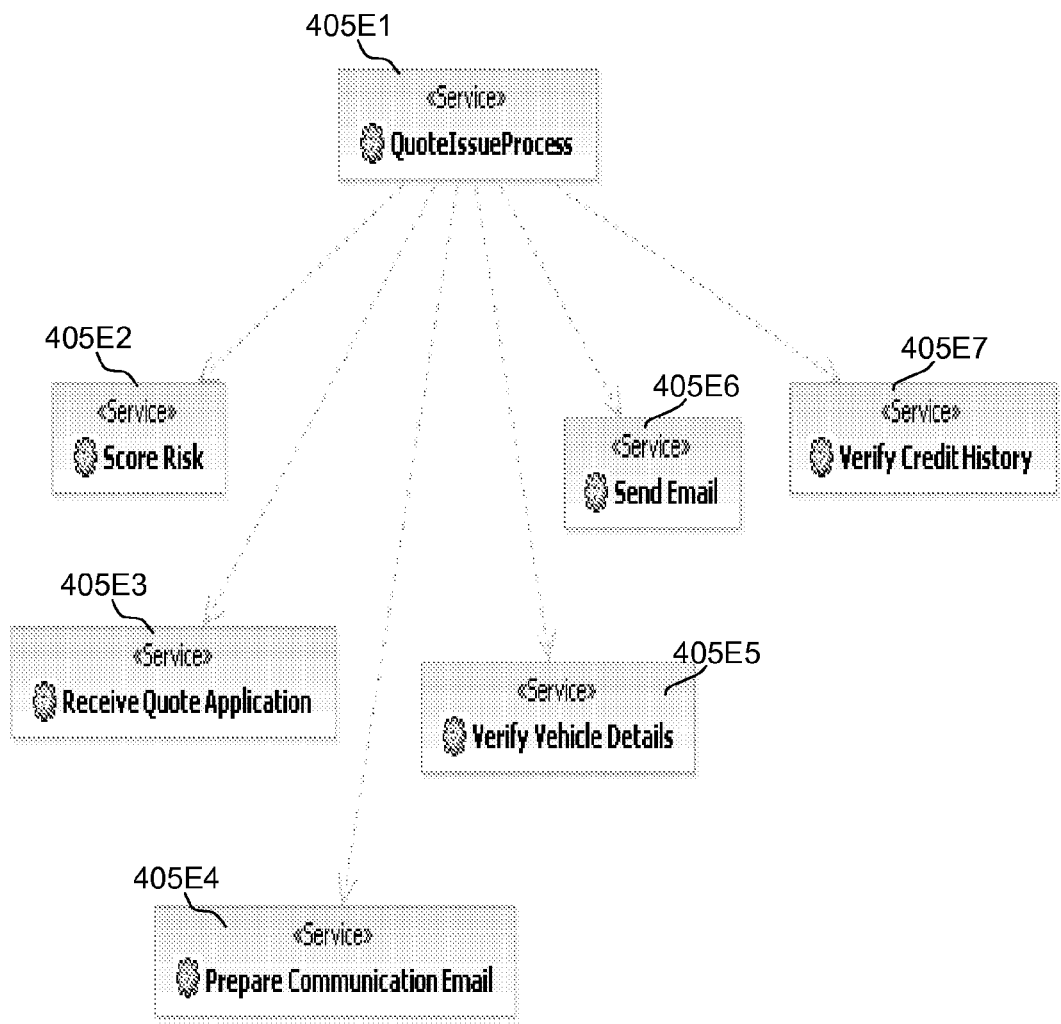
FIGS. 4A and 4B illustrate an example of service dependency and service composition of a SOA service model that defines reference partners for a SCA component, in accordance with the embodiments of the present invention.
Figure 4B:
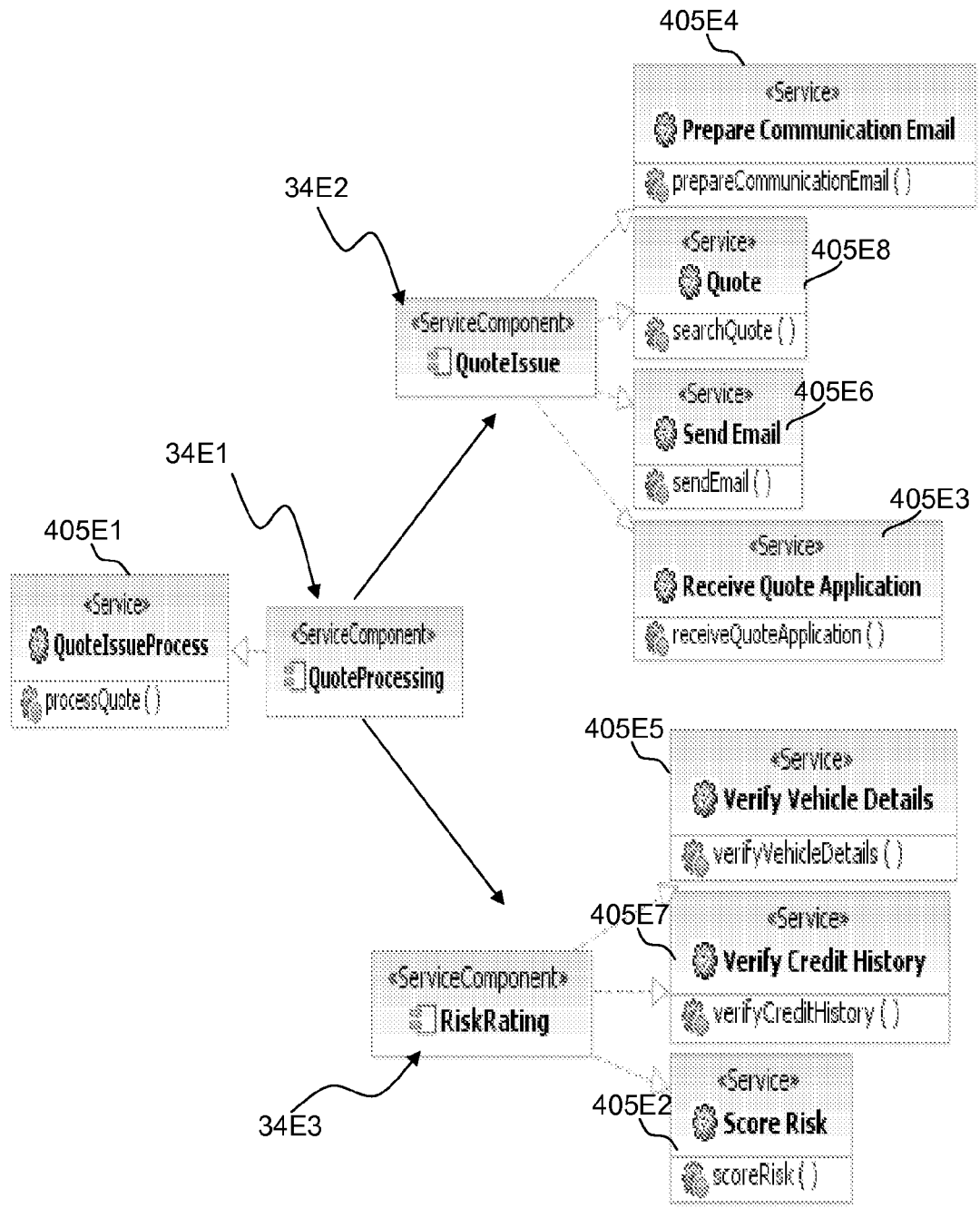

FIGS. 4A and 4B illustrate an example of service dependency and service composition of a SOA service model that defines reference partners for a SCA component, in accordance with the embodiments of the present invention.

In FIG. 4A, a service QuoteIssueProcess 405E1 is dependent upon services Score Risk 405E2, Receive Quote Application 405E3, Prepare Communication Email 405E4, Verify Vehicle Details 405E5, Send Email 405E6 and verify Credit History 405E7.

In FIG. 4B, the service QuoteIssueProcess 405E1 is allocated to the service component QuoteProcessing 34E1 as shown in FIG. 3D, supra.

The services Prepare Communication Email 405E4, Receive Quote Application 405E3, and Send Email 405E6 are allocated to the service component QuoteIssue 34E2 as shown in FIG. 3D, supra. The services Score Risk 405E2, Verify Credit History 405E7, and verify Vehicle Details 405E5 are allocated to the service component RiskRating 34E3 as shown in FIG. 3D, supra. Thus, the service component QuoteProcessing 34E1 to which the service QuoteIssueProcess 405E1 has been assigned to should have reference partners corresponding to interfaces of the service components QuoteIssue 34E2 and RiskRating 34E3. See FIG. 3D, supra, for reference partners 35E1 and 35E2 denoted for the service component QuoteProcessing 34E1, interfacing with the service component QuoteIssue 34E2 and the service component RiskRating 34E3, respectively.

Figure 4C:
FIG. 4C illustrates interface definitions of SCA components, which are generated from service allocations of a SOA service model, in accordance with the embodiments of the present invention.

FIG. 4C illustrates examples of interface definitions for SCA components, which are generated from service allocations of a SOA service model, in accordance with the embodiments of the present invention.

The service allocations of the SOA service model are shown in FIG. 2D, supra. A service component interface is defined as a union of interfaces of services that are allocated to the service component. Because a service component interface IRiskRating 425E1 is defined for the service component RiskRating 34E3 of FIGS. 3D and 4B, supra, the service component interface IRiskRating 425E1 is named after the name of the service component RiskRating 34E3. The service component interface IRiskRating 425E1 is a union of service interfaces scoreRisk 425E2, verifyCreditHistory 425E3 and verifyvehicleDetails 425E4, which are interfaces of the services Score Risk 405E2, Verify Credit History 405E7, and Verify Vehicle Details 405E5 as shown in FIG. 4B, supra.

Figure 5:
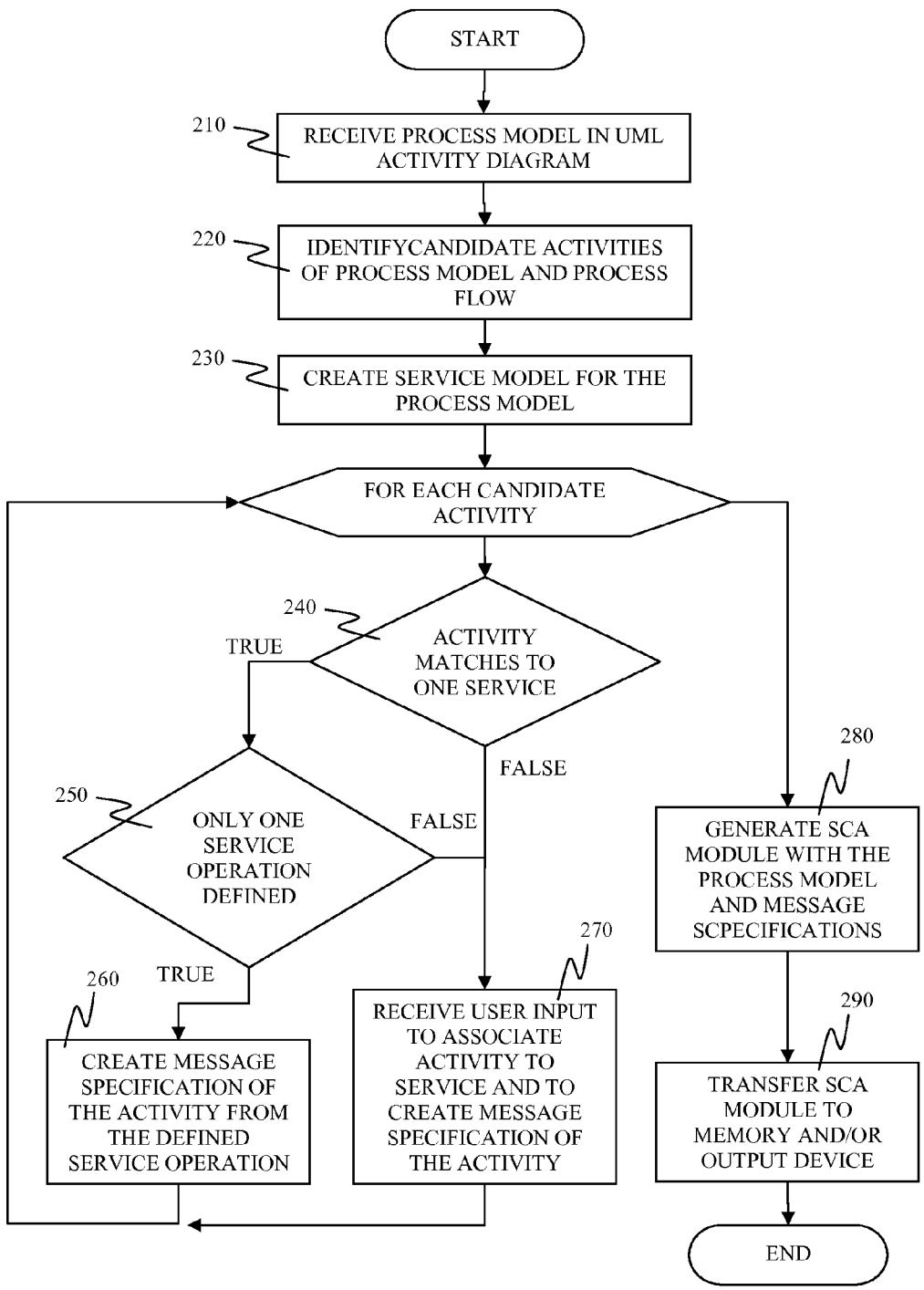
FIG. 5 is a flowchart depicting the method for generating a SCA module with SOA model elements, in accordance with the embodiments of the present invention.

FIG. 5 is a flowchart depicting a method for generating a Service Component Architecture (SCA) module with Service Oriented Architecture (SOA) model elements, in accordance with the embodiments of the present invention.

The method is performed by a module generating process in following steps. In step 210, the module generating process receives a process model in UML activity diagram format. The process model is provided to the module generating process by a conventional modeling tool, a user input, etc. See FIG. 2A for an example of a process model in UML activity diagram format. The module generating process proceeds with step 220.

Figure 5A:
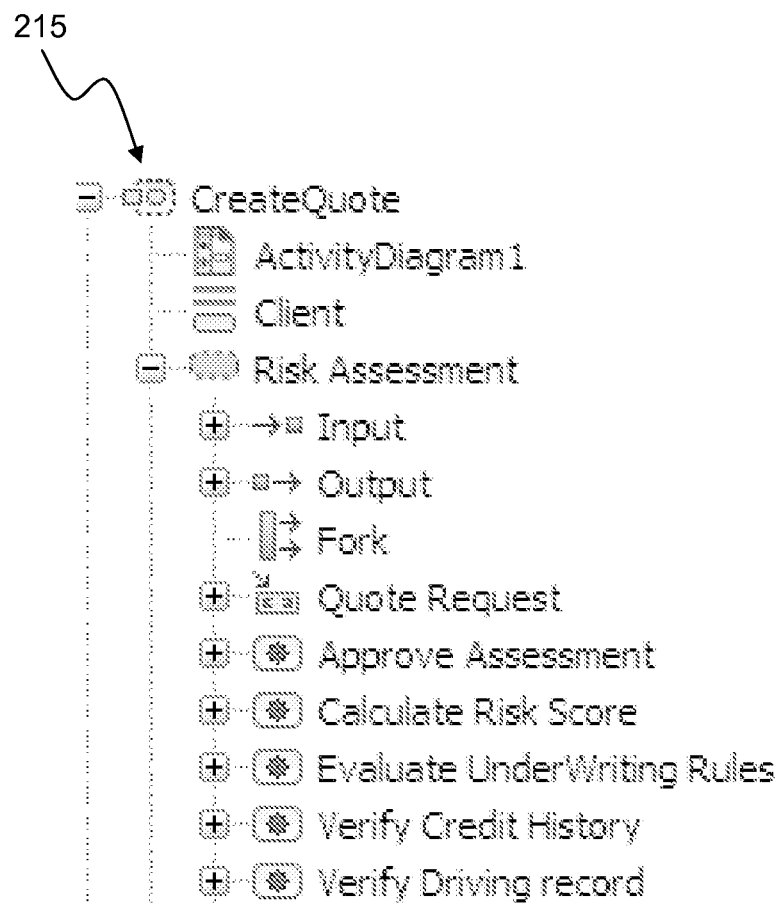

In one embodiment of the present invention, the process model created with IBM WebSphere Business Modeler (WBM) is imported into a UML project in IBM Rational Software Architecture (RSA) authoring tool. A UML activity diagram representing the imported process model is created afterward. See FIG. 5A for an example of a UML project in IBM RSA comprising the imported process model, after the module generating process performs step 210.

Figure 5B:
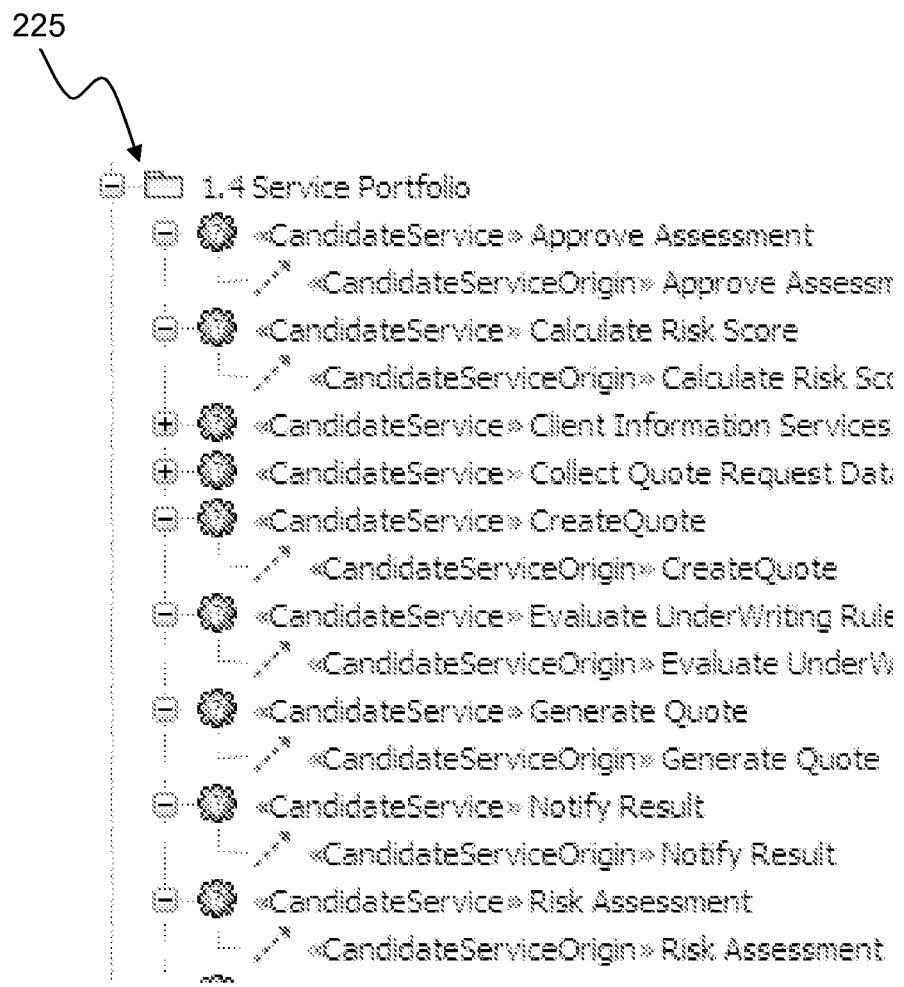

In step 220, the module generating process identifies candidate activities and a process flow in the received process model. Each task in the process model that is represented as a node in the UML activity diagram is a candidate activity. Inputs and outputs of each task that are represented as arrows in the UML activity diagram determine the process flow. See FIG. 5B for an example of the candidate activities and the process flow of the process model in FIG. 5A, after the module generating process performs step 220. The module generating process proceeds with step 230.

In step 230, the module generating process creates a service model for the received process model. The service model comprises at least one candidate service that is matched to candidate activities of the process model. The module generating process proceeds with step 240.

The module generating process performs a loop comprising steps 240 to 270 for each candidate activity in the received process model. In the loop, prior to performing step 240, the module generating process examines whether there is more candidate activity for the loop to process. One of unprocessed candidate activity is selected as a current activity each iteration of the loop. The module generating process proceeds with step 280 upon processing the loop for all candidate activities.

In step 240, the module generating process determines whether the current activity matches to one service in the created service model. Wherein an origin of the current activity and an origin of a candidate service are identical, the module generating process determines that the current activity matches to the candidate service. If the module generating process determines that the current activity matches to the candidate service in the created service model, then the module generating process proceeds with step 250 to further process the matched candidate service. If the module generating process determines that the current activity matches to no candidate service in the created service model, then the module generating process proceeds with step 270 for a user input.

Figure 5C:
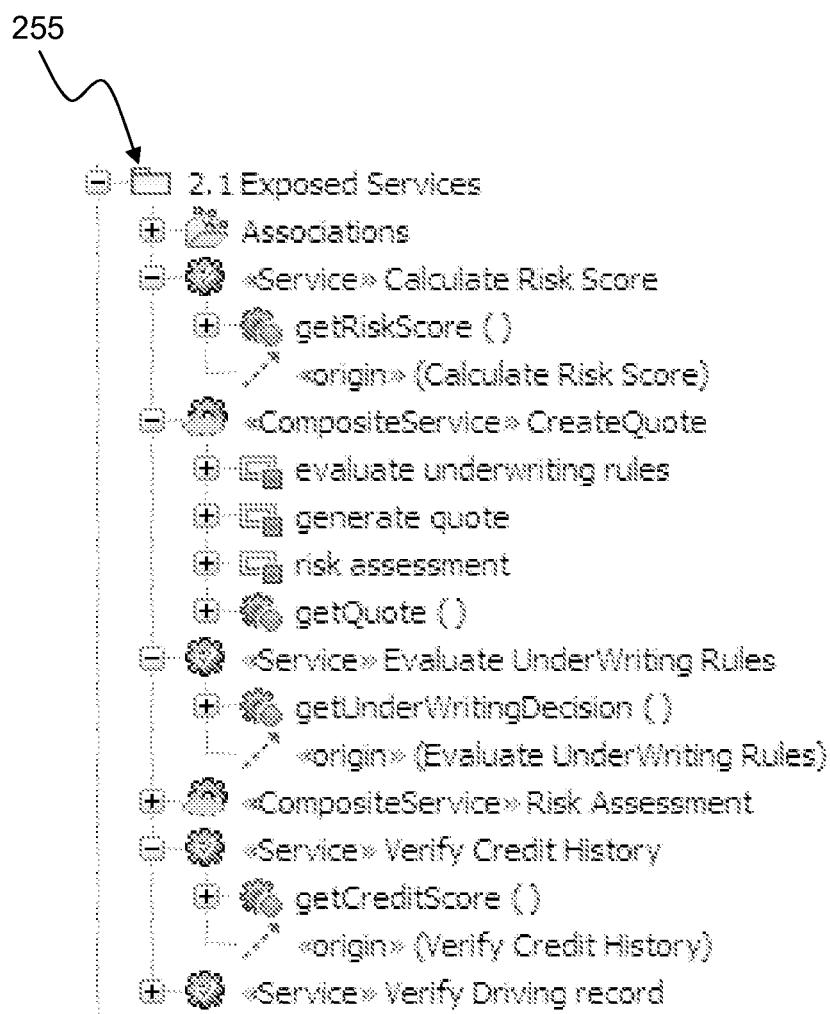

In step 250, the module generating process determines whether the matched candidate service from step 240 has only one service operation definition. If the module generating process determines that the matched candidate service has only one service operation definition, then the module generating process proceeds with step 260 to further process the service operation definition. If the module generating process determines that the matched candidate service has no operation definition or multiple operation definitions, then the module generating process proceeds with step 270 for the user input. See FIG. 5C for an example of service operation definitions located after the module generating process performs step 250.

Figure 5D:
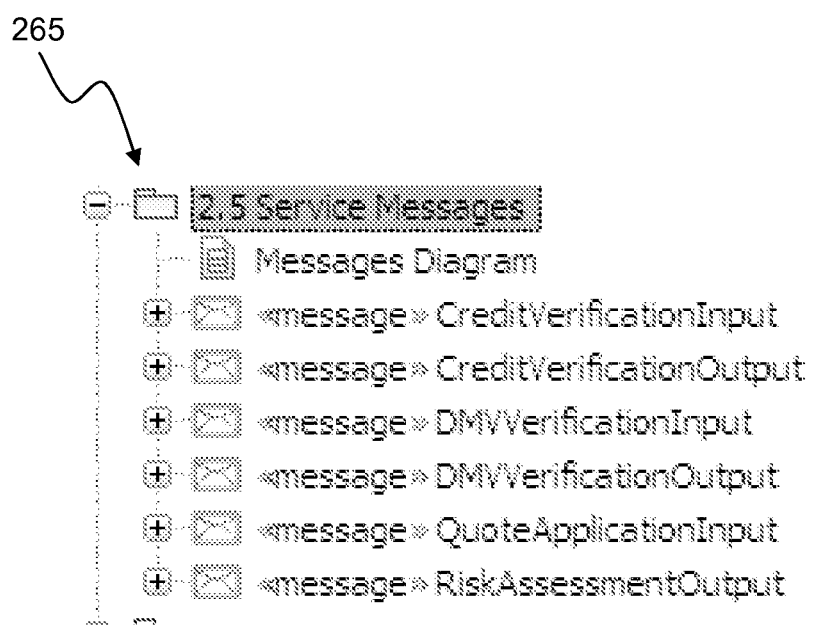

In step 260, the module generating process creates message specifications of the current activity with the service operation definition from step 250. The module generating process assigns input and output messages of the service operation definition as input and output objects of the current activity, which is used as a message specification of the current activity. See FIG. 5D for examples of message specifications. The module generating process starts over the loop after performing step 260.

In step 270, the module generating process receives the user input to associate the current candidate activity with a service operation definition and to create message specifications for the current candidate activity. In another embodiment of the present invention, the module generating process performs step 270 by substituting the user input with stub data, a default input, default data set, a tag for missing definition for later provision, a predefined data set for associating activities and services and/or for message specifications, etc., to minimize user interaction and to maximize automation while generating the SCA module. The module generating process starts over the loop after performing step 270.

Figure 5E:
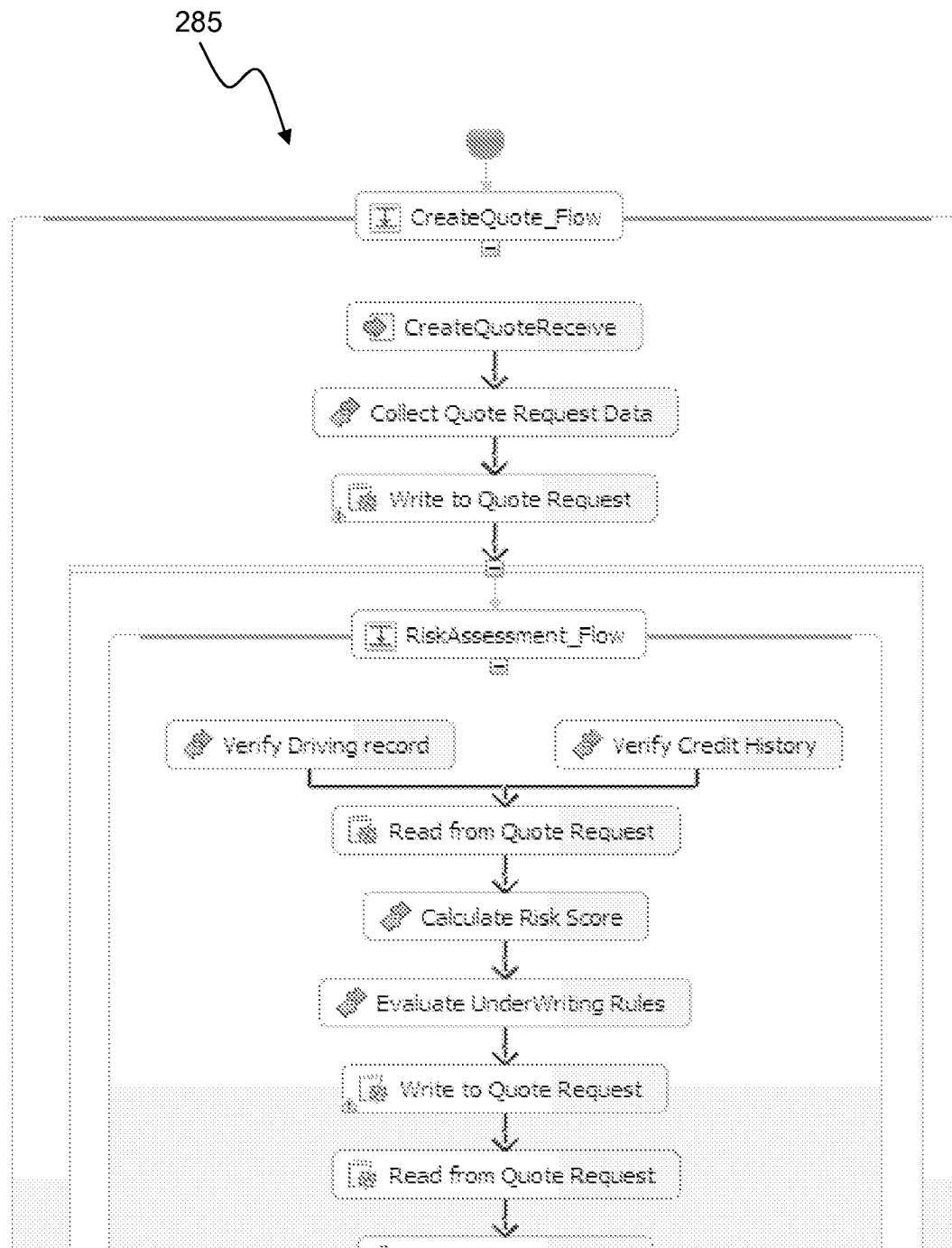

In step 280, the module generating process generates the SCA module with the candidate activities and the process flow identified in step 220, and the message specifications for each candidate activity created in step 260 or data provided in step 270. In one embodiment of the present invention, the generated SCA module is in Business Process Execution Language (BPEL), Java, or a combination thereof. See FIG. 5E for an example of the generated SCA module in BPEL. The module generating process proceeds with step 290.

In step 290, the module generating process stores the generated SCA module in a memory device coupled to a computer system in which the module generating process operates, transfers the generated SCA module to an output device of the computer system, or both. The module generating process terminates after performing step 290.

Figure 6:
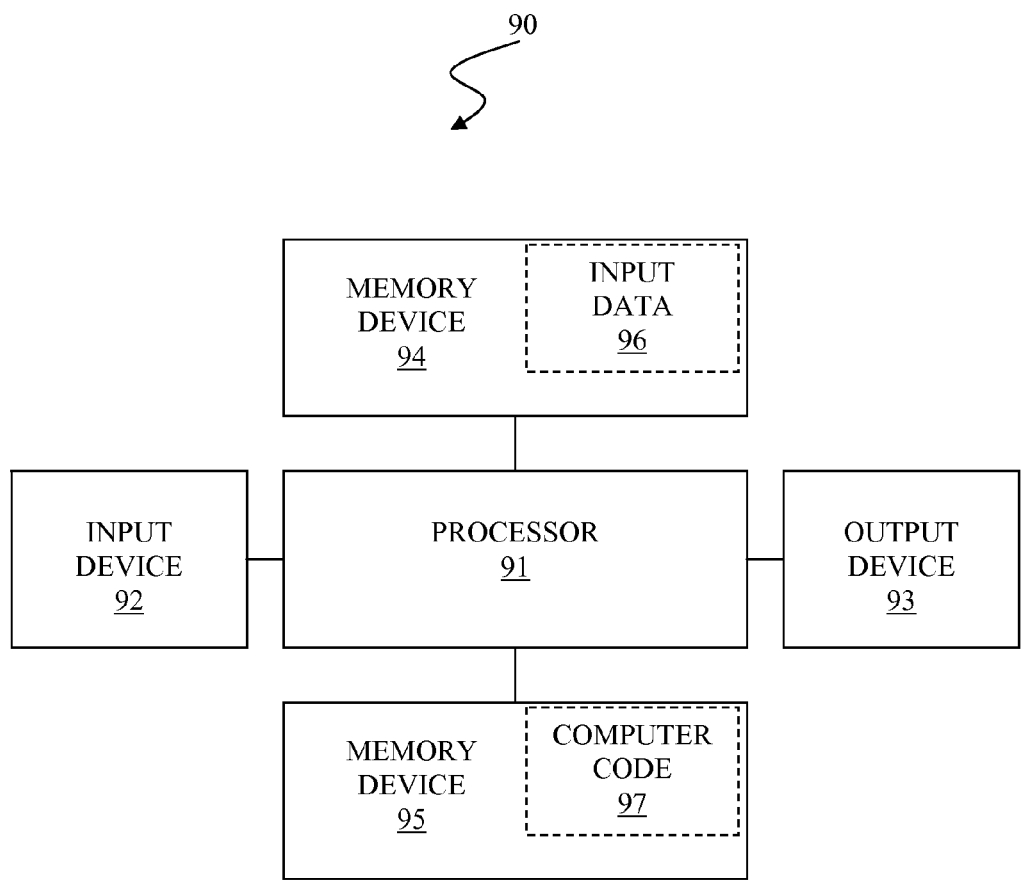
FIG. 6 illustrates a computer system used for generating a SCA module with SOA model elements, in accordance with the embodiments of the present invention.

FIG. 6 illustrates a computer system 90 used for generating a Service Component Architecture (SCA) module with Service Oriented Architecture (SOA) model elements, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for generating a SCA module with SOA model elements according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for generating a SCA module with SOA model elements.

In another embodiment, the invention provides a business method that performs the process steps of the invention on a subscription, advertising and/or fee basis. That is, a service provider, such as a Solution Integrator, can offer to create, maintain, support, etc. a process for determining web analytics information of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with an instruction execution system, apparatus, or device.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a Service Component Architecture (SCA) module with Service Oriented Architecture (SOA) model elements, said method comprising:

creating a service model corresponding to a process model, wherein the process model comprises at least one activity and a process flow, said at least one activity exchanging messages among said at least one activity according to said process flow, and wherein the service model comprises at least one service and at least one service operation definition;

associating an activity of said at least one activity with a service of said at least one service such that an origin of the activity is identical to an origin of the service;

determining a service operation definition of said at least one service operation definition that specifies an interface of the service associated with the activity, wherein said determining the service operation definition comprises: discovering more than one service operation definitions of said at least one service operation definition that specify a respective interface of the service associated with the activity, acquiring user input data that selects one service operation definition out of said more than one service operation definitions, and identifying said one service operation definition as the service operation definition that specifies the interface of the service;

rendering a message specification of the activity from the interface of the service;

a processor of a computer system producing the SCA module with the SOA model elements, wherein the SOA model elements comprise said at least one activity, the process flow, and the message specification, and wherein the SCA module is executable in the process flow, the SCA module comprising the activity communicating among said at least one activity according to the rendered message specification; and communicating the produced SCA module to a user of the computer system.

2. The method of claim 1, said associating comprising:

discovering no service of said at least one service that has a same origin as the origin of the activity;

acquiring data that selects another service of said at least one service, wherein said data is selected from the group consisting of a user input, default data, predefined data, and a combination thereof; and associating the activity with said another service.

3. The method of claim 1, wherein the process model is a Unified Modeling Language (UML) activity diagram, wherein the service model is a Service-Oriented Architecture task service model, and wherein the SCA module is selected from the group consisting of a Business Process Execution Language (BPEL) code, a Java code, and a combination thereof.

4. A computer program product comprising:

a computer readable storage hardware device having a computer readable program code embodied therein, said computer readable program code containing instructions that perform a method for generating a Service Component Architecture (SCA) module with Service Oriented Architecture (SOA) model elements, said method comprising:

creating a service model corresponding to a process model, wherein the process model comprises at least one activity and a process flow, said at least one activity exchanging messages among said at least one activity according to said process flow, and wherein the service model comprises at least one service and at least one service operation definition;

associating an activity of said at least one activity with a service of said at least one service such that an origin of the activity is identical to an origin of the service;

determining a service operation definition of said at least one service operation definition that specifies an interface of the service associated with the activity, wherein said determining the service operation definition comprises: discovering more than one service operation definitions of said at least one service operation definition that specify a respective interface of the service associated with the activity, acquiring user input data that selects one service operation definition out of said more than one service operation definitions, and identifying said one service operation definition as the service operation definition that specifies the interface of the service;

rendering a message specification of the activity from the interface of the service;

a processor of a computer system producing the SCA module with the SOA model elements, wherein the SOA model elements comprise said at least one activity, the process flow, and the message specification, and wherein the SCA module is executable in the process flow, the SCA module comprising the activity communicating among said at least one activity according to the rendered message specification; and communicating the produced SCA module to a user of the computer system.

5. The computer program product of claim 4, said associating comprising:

discovering no service of said at least one service that has a same origin as the origin of the activity;

acquiring data that selects another service of said at least one service, wherein said data is selected from the group consisting of a user input, default data, predefined data, and a combination thereof; and associating the activity with said another service.

6. The computer program product of claim 4, wherein the process model is a Unified Modeling Language (UML) activity diagram, wherein the service model is a Service-Oriented Architecture task service model, and wherein the SCA module is selected from the group consisting of a Business Process Execution Language (BPEL) code, a Java code, and a combination thereof.

7. A computer system comprising:

a processor and a computer readable storage hardware device coupled to the processor, said computer readable storage medium containing instructions that when executed by the processor implement a method for generating a Service Component Architecture (SCA) module with Service Oriented Architecture (SOA) model elements, said method comprising:

creating a service model corresponding to a process model, wherein the process model comprises at least one activity and a process flow, said at least one activity exchanging messages among said at least one activity according to said process flow, and wherein the service model comprises at least one service and at least one service operation definition;

associating an activity of said at least one activity with a service of said at least one service such that an origin of the activity is identical to an origin of the service;

determining a service operation definition of said at least one service operation definition that specifies an interface of the service associated with the activity, wherein said determining the service operation definition comprises: discovering more than one service operation definitions of said at least one service operation definition that specify a respective interface of the service associated with the activity, acquiring user input data that selects one service operation definition out of said more than one service operation definitions, and identifying said one service operation definition as the service operation definition that specifies the interface of the service;

rendering a message specification of the activity from the interface of the service;

producing the SCA module with the SOA model elements, wherein the SOA model elements comprise said at least one activity, the process flow, and the message specification, and wherein the SCA module is executable in the process flow, the SCA module comprising the activity communicating among said at least one activity according to the rendered message specification; and communicating the produced SCA module to a user of the computer system.

8. The computer system of claim 7, said associating comprising:

discovering no service of said at least one service that has a same origin as the origin of the activity;

acquiring data that selects another service of said at least one service, wherein said data is selected from the group consisting of a user input, default data, predefined data, and a combination thereof; and associating the activity with said another service.

9. The computer system of claim 7, wherein the process model is a Unified Modeling Language (UML) activity diagram, wherein the service model is a Service-Oriented Architecture task service model, and wherein the SCA module is selected from the group consisting of a Business Process Execution Language (BPEL) code, a Java code, and a combination thereof.

10. A process for supporting computer infrastructure, said process comprising providing at least one support service for at least one of creating, integrating, hosting, maintaining, and deploying computer-readable code in a computing system, wherein the code in combination with the computing system is capable of performing a method for generating a Service Component Architecture (SCA) module with Service Oriented Architecture (SOA) model elements, said method comprising:

creating a service model corresponding to a process model, wherein the process model comprises at least one activity and a process flow, said at least one activity exchanging messages among said at least one activity according to said process flow, and wherein the service model comprises at least one service and at least one service operation definition;

associating an activity of said at least one activity with a service of said at least one service such that an origin of the activity is identical to an origin of the service;

determining a service operation definition of said at least one service operation definition that specifies an interface of the service associated with the activity, wherein said determining the service operation definition comprises: discovering more than one service operation definitions of said at least one service operation definition that specify a respective interface of the service associated with the activity, acquiring user input data that selects one service operation definition out of said more than one service operation definitions, and identifying said one service operation definition as the service operation definition that specifies the interface of the service;

rendering a message specification of the activity from the interface of the service;

a processor of a computer system producing the SCA module with the SOA model elements, wherein the SOA model elements comprise said at least one activity, the process flow, and the message specification, and wherein the SCA module is executable in the process flow, the SCA module comprising the activity communicating among said at least one activity according to the rendered message specification; and communicating the produced SCA module to a user of the computer system.

11. The process of claim 10, said associating comprising:

discovering no service of said at least one service that has a same origin as the origin of the activity;

acquiring data that selects another service of said at least one service, wherein said data is selected from the group consisting of a user input, default data, predefined data, and a combination thereof; and associating the activity with said another service.

12. The process of claim 10, wherein the process model is a Unified Modeling Language (UML) activity diagram, wherein the service model is a Service-Oriented Architecture task service model, and wherein the SCA module is selected from the group consisting of a Business Process Execution Language (BPEL) code, a Java code, and a combination thereof.

* * * * *